Patented July 12, 1932

1,867,357

UNITED STATES PATENT OFFICE

WILLIAM H. FURNESS, OF NATIONAL PARK, NEW JERSEY, ASSIGNOR, BY MESNE ASSIGNMENTS, TO FURNESS CORPORATION, OF PHILADELPHIA, PENNSYLVANIA, A CORPORATION OF NEW JERSEY

METHOD OF MAKING COPPER HYDROXIDE

No Drawing. Application filed February 23, 1927. Serial No. 170,433.

This invention relates to the manufacture of copper hydroxide, and it is an improvement over the process described in my co-pending application, Serial No. 56,553, filed Sept. 15, 1925.

In the aforesaid application I have disclosed a cyclic process for the preparation of copper hydroxide in which the hydroxide is precipitated from an ammoniacal solution of a copper salt by the addition of a caustic alkali, the liberated ammonia being employed to make a fresh batch of cuprammonium salt solution. The aqueous ammonia solution, after the removal of the precipitated $Cu(OH)_2$ and the by-product, sodium salt, is utilized directly by dissolving in it a fresh batch of copper salt, preferably in the solid state.

By that process I produce pure copper hydroxide which is very useful in the artificial silk industry in dissolving the cotton employed in the manufacture of the silk. If the hydroxide is impure, the solution is unstable, and the silk is very difficult to spin.

By the present process I am enabled to economically produce pure copper hydroxide and obtain the advantages set forth and more fully stated in the aforesaid application.

In accordance with the present invention, while I employ the same cyclic principle of operation, I volatilize the ammonia gas contained in the ammoniacal filtrate resulting from the precipitation of $Cu(OH)_2$, and lead it into a solution of a copper salt, whereby a fresh batch of cuprammonium salt is formed.

The volatilization may be brought about in a number of ways, as, for example, by heat with or without vacuum, or by bubbling air through the solution with or without the application of heat.

In this connection the solution of a copper salt is a very efficient absorbing agent for liberated ammonia gas, for it develops practically no vapor pressure of ammonia until almost the very end of absorption when the formation of the cuprammonium salt is practically complete—and even at this point the ammonia vapor pressure is very small. For this reason the copper salt solution can absorb the ammonia gas quantitatively from even a dilute mixture with air. In addition, if the vessels containing the aqueous ammonia and the copper salt solution are connected, and the air pumped out, the ammonia gas will be practically completely boiled out of the ammonia solution and absorbed by the copper salt solution. Such a transfer may be effected even at room temperature, but it may be desirable, from the standpoint of speed of operation, to warm the ammonia solution and cool the copper solution. As another alternative the vacuum may be dispensed with, and the ammonia solution boiled at atmospheric pressure, the liberated ammonia being absorbed by the copper salt solution.

The method chosen to volatilize the ammonia may be influenced by the following considerations. As set forth in the copending application referred to, the precipitation of copper hydroxide from a solution of a cuprammonium salt by means of caustic soda is not complete, a small proportion of the copper remaining in solution, either as undecomposed cuprammonium salt, or as a solution of copper hydroxide in the aqueous ammonia. When the ammonia is volatilized from this solution, this residual copper is precipitated as hydroxide. However, if the solution is heated to more than a moderate temperature, the copper hydroxide is, to a greater or less degree, decomposed to oxide, rendering it dark in color and unfit for the making of cellulose solutions.

Therefore, if the solution is boiled at atmospheric pressure, the extra copper hydroxide precipitated is not directly usable, but has a recovery value only. On this account it is preferable, depending upon the proportion of residual copper in solution, to volatilize the ammonia at temperatures not exceeding 50–55° C. which can be done either by the use of a vacuum, or by the blowing of air or other gas through the solution, such a procedure being easy of operation and highly efficient, owing to the great absorptive power of the copper salt solution for the ammonia gas.

As specific examples of the carrying out of my process, I give the following:

I dissolve 500 g. of copper sulphate ($Cu SO_4.5H_2O$) in about 1700 c. c. of water. To this add 500 c. c. of aqueous ammonia of a strength of approximately 26° Bé. which forms a deep blue solution of cuprammonium sulphate—($Cu(NH_3)_4SO_4$). This solution is filtered, if necessary, to remove any iron hydroxide or other impurities which may be precipitated. I then add a solution of caustic soda which precipitates the copper in the form of granular light blue hydroxide of remarkable purity. The amount of caustic soda so added should be preferably the theoretical quantity required to combine with the $SO_4$ of the copper compound, or perhaps slightly more, say from 160 to 170 g. $Na OH$. The copper hydroxide is then removed by filtration or otherwise, and the solution containing free ammonia and a little copper may be treated as follows:

(a) The solution may be boiled at atmospheric pressure, the liberated ammonia being absorbed in a fresh solution of 500 g. of copper sulphate in 1700 c. c. of water, the process of absorption being assisted by stirring. The residual impure copper hydroxide which is precipitated in the boiling ammonia solution may be recovered by converting it into copper sulphate. It may be necessary to add a little ammonia to the absorbing solution to make up for incidental losses, and to insure that all of the copper is present in the solution in the form of cuprammonium sulphate.

(b) The ammonia solution may be subjected to vacuum, and the ammonia gas liberated is then absorbed in a fresh copper sulphate solution, the temperature being kept low enough to prevent the degradation of the residual copper hydroxide precipitated by the liberation of the ammonia. The temperature is preferably kept below 50° C. and should preferably not exceed 55° C.

(c) Air may be bubbled through the ammonia solution at a temperature preferably below 50° C. and is then led into the fresh copper sulphate solution.

Where the procedure of paragraphs b and c is followed, the extra copper hydroxide precipitated from the ammonia solution is of good quality, and may be used directly in the preparation of cellulose solutions.

In all three cases, the cuprammonium sulphate solution, when prepared, is filtered, precipitated with caustic soda solution, as described above, and the cycle repeated.

While I have above given the preferred practice, and the preferred chemical compounds to be employed, as well as the proportions thereof, it is to be understood that this specification is not limited thereto. Salts of copper other than the sulphate can be employed, and caustic soda may be replaced by other alkali hydroxides. The proportions given are those most favorable from an economic standpoint, but they may be varied within limits without other effect than the lessening of the efficiency and economy of the process.

What I claim is:

The herein described cyclic process of making copper hydroxide which comprises preparing an ammoniacal solution of a copper salt, precipitating copper hydroxide by adding a caustic alkali, removing the copper hydroxide, and heating the resultant filtrate under reduced pressure and at a temperature not exceeding about 55° C. to simultaneously volatilize the ammonia and precipitate residual copper hydroxide, and absorbing the ammonia in a fresh solution of a copper salt to repeat the cycle.

In testimony whereof I have hereunto signed my name.

WILLIAM H. FURNESS.